US010062075B2

(12) United States Patent
Skiba et al.

(10) Patent No.: US 10,062,075 B2
(45) Date of Patent: Aug. 28, 2018

(54) SYSTEMS AND METHODS FOR USING A DUAL FUNCTION MEDICAL BENEFITS CARD

(71) Applicants: Robert Skiba, Sandy Springs, GA (US); Tim Richardson, Mesa, AZ (US); Jeff Lewis, Waukesha, WI (US); Devin Wade, Redwood City, CA (US)

(72) Inventors: Robert Skiba, Sandy Springs, GA (US); Tim Richardson, Mesa, AZ (US); Jeff Lewis, Waukesha, WI (US); Devin Wade, Redwood City, CA (US)

(73) Assignee: e2interactive, Inc., Atlanta, GA (US)

(*) Notice: Subject to any disclaimer, the term of this patent is extended or adjusted under 35 U.S.C. 154(b) by 28 days.

(21) Appl. No.: 14/070,800

(22) Filed: Nov. 4, 2013

(65) Prior Publication Data
US 2015/0127476 A1 May 7, 2015

(51) Int. Cl.
G06Q 20/34 (2012.01)
G06Q 20/20 (2012.01)

(52) U.S. Cl.
CPC ....... G06Q 20/3574 (2013.01); G06Q 20/204 (2013.01); G06Q 20/3572 (2013.01)

(58) Field of Classification Search
None
See application file for complete search history.

(56) References Cited

U.S. PATENT DOCUMENTS

| 5,128,520 | A | 6/1992 | Rando |
| 5,231,569 | A | 7/1993 | Myatt |
| 5,256,863 | A | 10/1993 | Ferguson |
| 5,350,906 | A | 9/1994 | Brody et al. |
| 5,375,240 | A | 12/1994 | Grundy |
| 5,416,306 | A | 5/1995 | Imhata |
| 5,619,559 | A | 4/1997 | Kennedy |
| 5,671,279 | A | 9/1997 | Elgamal |
| 5,754,981 | A | 5/1998 | Veeneman |
| 5,765,143 | A | 6/1998 | Sheldon |

(Continued)

OTHER PUBLICATIONS

International Search Report completed Dec. 29, 2014; 2 pages.
International Preliminary Report on Patentability, dated May 10, 2016, 9 pages.

Primary Examiner — Paul Danneman
(74) Attorney, Agent, or Firm — Landmark Intellectual Property Law, PLLC

(57) ABSTRACT

The invention is generally directed to methods of conducting transactions using a dual function card that is transacted amongst a processor in communication with a point of sale: receiving a message including: an indicia of the card and identifiers of goods; identifying a closed loop account and amount, a schedule of eligible goods, and an open loop account and amount; determining eligible goods and a purchase amount; comparing the purchase amount to the amount in the closed loop account, and if the purchase amount is less than or equal to value in the closed loop account, authorizing the transaction. Upon a determination that the purchase amount is less than the amount in the closed loop account, determining if the value in the open loop account is greater than or equal to the deficit, and if so, deducting all value from the closed loop account and the deficit from the open loop account.

11 Claims, 7 Drawing Sheets

(56) References Cited

U.S. PATENT DOCUMENTS

| | | | |
|---|---|---|---|
| 5,804,803 A | 9/1998 | Cragun | |
| 5,850,217 A | 12/1998 | Cole | |
| 5,857,175 A | 1/1999 | Day | |
| 5,907,142 A | 5/1999 | Kelsey | |
| 5,937,393 A | 8/1999 | O'Leary et al. | |
| 5,950,173 A | 9/1999 | Perkowski | |
| 5,968,110 A | 10/1999 | Westrope | |
| 5,991,750 A | 11/1999 | Watson | |
| 6,014,635 A | 1/2000 | Harris | |
| 6,029,139 A | 2/2000 | Bezos | |
| 6,032,133 A | 2/2000 | Hilt et al. | |
| 6,039,244 A | 3/2000 | Finsterwald | |
| 6,085,167 A | 7/2000 | Iguchi | |
| 6,119,099 A | 9/2000 | Walker | |
| 6,125,352 A | 9/2000 | Franklin | |
| 6,134,533 A | 10/2000 | Shell | |
| 6,138,911 A | 10/2000 | Fredregil | |
| 6,154,738 A | 11/2000 | Call | |
| 6,182,894 B1 | 2/2001 | Hackett et al. | |
| 6,222,914 B1 | 4/2001 | McMullin | |
| 6,529,880 B1 | 3/2003 | Mckeen et al. | |
| 6,609,106 B1 | 8/2003 | Robertson | |
| 6,675,153 B1 | 1/2004 | Cook et al. | |
| 6,736,314 B2 | 5/2004 | Cooper et al. | |
| 6,886,742 B2 | 5/2005 | Stoutenburg et al. | |
| 6,915,277 B1 * | 7/2005 | Manchester | G06Q 20/10 705/39 |
| 6,993,510 B2 | 1/2006 | Guy | |
| 7,086,586 B1 | 8/2006 | Sullivan | |
| 7,111,780 B2 | 9/2006 | Broussard et al. | |
| 7,252,226 B2 | 8/2007 | Risafi et al. | |
| 7,281,653 B2 | 10/2007 | Beck et al. | |
| 7,363,265 B2 | 4/2008 | Horgan | |
| 7,434,729 B2 * | 10/2008 | Cracchiolo | G06Q 40/00 235/380 |
| 7,590,557 B2 | 9/2009 | Harrison | |
| 7,631,803 B2 | 12/2009 | Peyret | |
| 7,653,599 B2 | 1/2010 | Doran et al. | |
| 7,757,944 B2 | 7/2010 | Cline | |
| 7,769,695 B2 | 8/2010 | Robinson | |
| 7,905,399 B2 | 3/2011 | Barnes et al. | |
| 7,922,083 B2 | 4/2011 | Harrison | |
| 7,970,626 B2 | 6/2011 | Cracchiolo | |
| 8,036,953 B2 | 10/2011 | Hsu | |
| 8,152,060 B2 | 4/2012 | Wolfe et al. | |
| 8,152,061 B2 | 4/2012 | Wolfe et al. | |
| 8,245,910 B2 | 8/2012 | Sullivan et al. | |
| 8,265,950 B2 | 9/2012 | Howe | |
| 8,267,313 B2 | 9/2012 | Harper et al. | |
| 8,332,277 B2 | 12/2012 | Mccaffery et al. | |
| 8,631,999 B2 | 1/2014 | Wolfe et al. | |
| 2002/0016749 A1 | 2/2002 | Borecki et al. | |
| 2002/0069139 A1 | 6/2002 | Bernstein et al. | |
| 2002/0095420 A1 | 7/2002 | Hovsepian | |
| 2002/0128859 A1 | 9/2002 | Perkowski | |
| 2003/0061162 A1 | 3/2003 | Matthews | |
| 2003/0069846 A1 | 4/2003 | Marcon | |
| 2003/0080186 A1 | 5/2003 | Mcdonald et al. | |
| 2003/0088462 A1 | 5/2003 | Carrithers et al. | |
| 2003/0172039 A1 | 9/2003 | Guy | |
| 2003/0212796 A1 | 11/2003 | Willard | |
| 2004/0024697 A1 | 2/2004 | Landa et al. | |
| 2004/0138921 A1 | 7/2004 | Broussard et al. | |
| 2004/0153344 A1 | 8/2004 | Bui | |
| 2004/0182922 A1 | 9/2004 | Talarico, Jr. | |
| 2004/0206814 A1 | 10/2004 | Kawai et al. | |
| 2004/0260647 A1 | 12/2004 | Blinn et al. | |
| 2005/0071268 A1 | 3/2005 | Riddett, Jr. | |
| 2005/0167481 A1 | 8/2005 | Hansen et al. | |
| 2005/0197919 A1 | 9/2005 | Robertson | |
| 2005/0274793 A1 | 12/2005 | Cantini | |
| 2006/0010007 A1 | 1/2006 | Denman | |
| 2006/0069642 A1 | 3/2006 | Doran et al. | |
| 2006/0078100 A1 | 4/2006 | Risafi et al. | |
| 2006/0080174 A1 | 4/2006 | Veeneman | |
| 2006/0106642 A1 | 5/2006 | Reicher et al. | |
| 2006/0212345 A1 | 9/2006 | Soza | |
| 2006/0255125 A1 | 11/2006 | Jennings | |
| 2006/0261150 A1 | 11/2006 | Seifert et al. | |
| 2006/0277146 A1 | 12/2006 | Dively et al. | |
| 2007/0011025 A1 | 1/2007 | Cracchiolo | |
| 2007/0214080 A1 | 9/2007 | Babi et al. | |
| 2008/0040265 A1 | 2/2008 | Rackley | |
| 2008/0059226 A1 | 3/2008 | Melker | |
| 2008/0133266 A1 | 6/2008 | Allen | |
| 2008/0162341 A1 | 7/2008 | Zimmer et al. | |
| 2008/0209511 A1 | 8/2008 | Silverbrook | |
| 2009/0172551 A1 | 7/2009 | Kane | |
| 2009/0254432 A1 | 10/2009 | Mccaffery et al. | |
| 2010/0057580 A1 | 3/2010 | Raghunathan | |
| 2010/0185505 A1 | 7/2010 | Sprogoe | |
| 2010/0235290 A1 | 9/2010 | Junger | |
| 2010/0312636 A1 | 12/2010 | Coulter et al. | |
| 2011/0060904 A9 | 3/2011 | Whitfield | |
| 2011/0087592 A1 * | 4/2011 | van der Veen et al. | 705/44 |
| 2011/0166992 A1 | 7/2011 | Dessert et al. | |
| 2012/0012648 A1 | 1/2012 | Collins et al. | |
| 2012/0271689 A1 | 10/2012 | Etheredge | |
| 2012/0290366 A1 | 11/2012 | Giles | |
| 2013/0179177 A1 | 7/2013 | Dhavle et al. | |

* cited by examiner

SYSTEMS AND METHODS FOR USING A DUAL FUNCTION MEDICAL BENEFITS CARD

BACKGROUND OF THE INVENTION

The present invention is generally directed to a medical benefits card that can be used to access funds to pay for eligible goods and/or services. More specifically, the present invention is directed to a dual function medical benefits card that can operate on a closed loop network with participating merchants for the purchase of eligible goods and/or and an open loop network with non-participating merchants for ineligible goods and/or services.

In general, insurance companies and health care providers often provide cards with various information thereon that can be used to indicate what goods and/or services the applicable insurance plan covers. Such cards can also be used at a point of sale (POS) in order for the POS to send a transaction to a processor who can determine what level or extent of coverage, if any, may apply to goods and/or services.

In addition, cards may be provided that have an associated account that can only be used for the purchase of eligible goods and/or services. For example, such cards may be linked to a health savings account, or to the MediCare/MedicAid system and the value associated therewith may only be used to purchase qualifying or eligible goods and/or services.

Moreover, certain insurance companies, health care providers, and even employers are offering incentives or benefits to customers and/or employees to lead a healthy lifestyle (thereby reducing the load on the health care system, and associated costs for employers). Such incentives may be in the form of discounts or dollar amounts.

Accordingly, it is desirable to provide a single product that can process both eligible goods and/or services as well as receive incentives, be linked to promotions, and be able to be processed both at participating merchants for eligible goods and/or services, but also to be widely accepted at other merchants for ineligible goods and/or services. Such cards may be used by an employer to identify insurance or health care programs, deposit incentives related thereto, deposit payroll or other bonuses, and associate the employee with various promotional programs or benefits.

SUMMARY OF THE INVENTION

Aspects in accordance with some embodiments of the present invention may include a method of conducting a transaction using a dual function card, the method transacted amongst a processor in selective communication with a merchant point of sale (POS), the method comprising: receiving by the processor a transaction message, the transaction message comprising: an indicia of the dual function card; and identifiers of one or more goods and/or services selected for obtainment by a customer at the POS; determining by the processor, based on the indicia of the dual function card: at least one associated closed loop value account, an amount of value associated with the closed loop value account, and a schedule of eligible goods and/or services that can be obtained using the at least one associated closed loop value account; at least one associated open loop value account, and an amount of value associated with the open loop value account; determining by the processor, eligible goods and/or services, if any, from the one or more goods and/or services; determining a total amount purchase amount for the eligible goods and/or services and comparing the total purchase amount for the eligible goods and/or services to the amount of value associated with the closed loop value account, and upon a determination that the total purchase amount for the eligible goods and/or services is less than or equal to the amount of value associated with the closed loop value account authorizing the transaction and deducting the total amount purchase amount from the amount of value associated with the closed loop account; upon a determination that the total purchase amount for the eligible goods and/or services is less than the amount of value associated with the closed loop account, determining a deficit and determining if the amount of value associated with the open loop account is greater than or equal to the deficit, and if so, authorizing the transaction and deducting all value from the closed loop value account and the deficit from the open loop value account.

Other aspects in accordance with some embodiments of the present invention may include a method of conducting a transaction using a dual function card, the method transacted amongst a central processor in selective communication with a merchant point of sale (POS), the method comprising: receiving at the POS identifiers of one or more goods and/or services for obtainment by a customer; receiving at the POS an indicia of a dual function card; determining by the POS, based upon the indicia of the dual function card, a processor associated with the dual function card; sending to the processor a transaction message comprising: the indicia of the dual function card; and the identifiers of the one or more goods and/or services; receiving by the processor the transaction message; determining by the processor, based on the indicia of the dual function card: at least one associated closed loop value account, an amount of value associated with the closed loop value account, and a schedule of eligible goods and/or services that can be obtained using the at least one associated closed loop value account; at least one associated open loop value account, and an amount of value associated with the open loop value account; determining by the processor, eligible goods and/or services, if any, from the one or more goods and/or services; determining a total amount purchase amount for the eligible goods and/or services and comparing the total purchase amount for the eligible goods and/or services to the amount of value associated with the closed loop value account, and upon a determination that the total purchase amount for the eligible goods and/or services is less than or equal to the amount of value associated with the closed loop value account authorizing the transaction and deducting the total amount purchase amount from the amount of value associated with the closed loop account; upon a determination that the total purchase amount for the eligible goods and/or services is less than the amount of value associated with the closed loop account, determining a deficit and determining if the amount of value associated with the open loop account is greater than or equal to the deficit, and if so, authorizing the transaction and deducting all value from the closed loop value account and the deficit from the open loop value account.

Other aspects in accordance with some embodiments of the present invention may include method of conducting a transaction using a dual function card associated with an indicia, the method transacted amongst a central processor in selective communication with one or more merchants, the method comprising: receiving at the central processor over an open loop network from a non-participating merchant a transaction request message, the transaction request message comprising: the indicia of the dual function card; and an open loop transaction amount; determining by the central processor based on the indicia an open loop value account and an amount of value therein; determining by the central processor if the transaction amount is less than or equal to the amount of value in the open loop value account, and if so, authorizing the transaction and deducting the transaction amount from the amount of value in the open loop account; receiving at the central processor over a closed loop or private network from a participating merchant a transaction request, the transaction request comprising: the indicia of the dual function card; and identifiers of one or more goods and/or services selected for obtainment by a customer at the POS; determining by the central processor, based on the indicia: at least one associated closed loop value account, an amount of value associated with the closed loop value account, and a schedule of eligible goods and/or services that can be obtained using the at least one associated closed loop value account; at least one associated open loop value account, and an amount of value associated with the open loop value account; determining by the processor, eligible goods and/or services, if any, from the one or more goods and/or services; determining a total amount purchase amount for the eligible goods and/or services and comparing the total purchase amount for the eligible goods and/or services to the amount of value associated with the closed loop value account, and upon a determination that the total purchase amount for the eligible goods and/or services is less than or equal to the amount of value associated with the closed loop value account authorizing the transaction and deducting the total amount purchase amount from the amount of value associated with the closed loop account; and upon a determination that the total purchase amount for the eligible goods and/or services is less than the amount of value associated with the closed loop account, determining a deficit and determining if the amount of value associated with the open loop account is greater than or equal to the deficit, and if so, authorizing the transaction and deducting all value from the closed loop value account and the deficit from the open loop value account.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWING

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Figure 1:
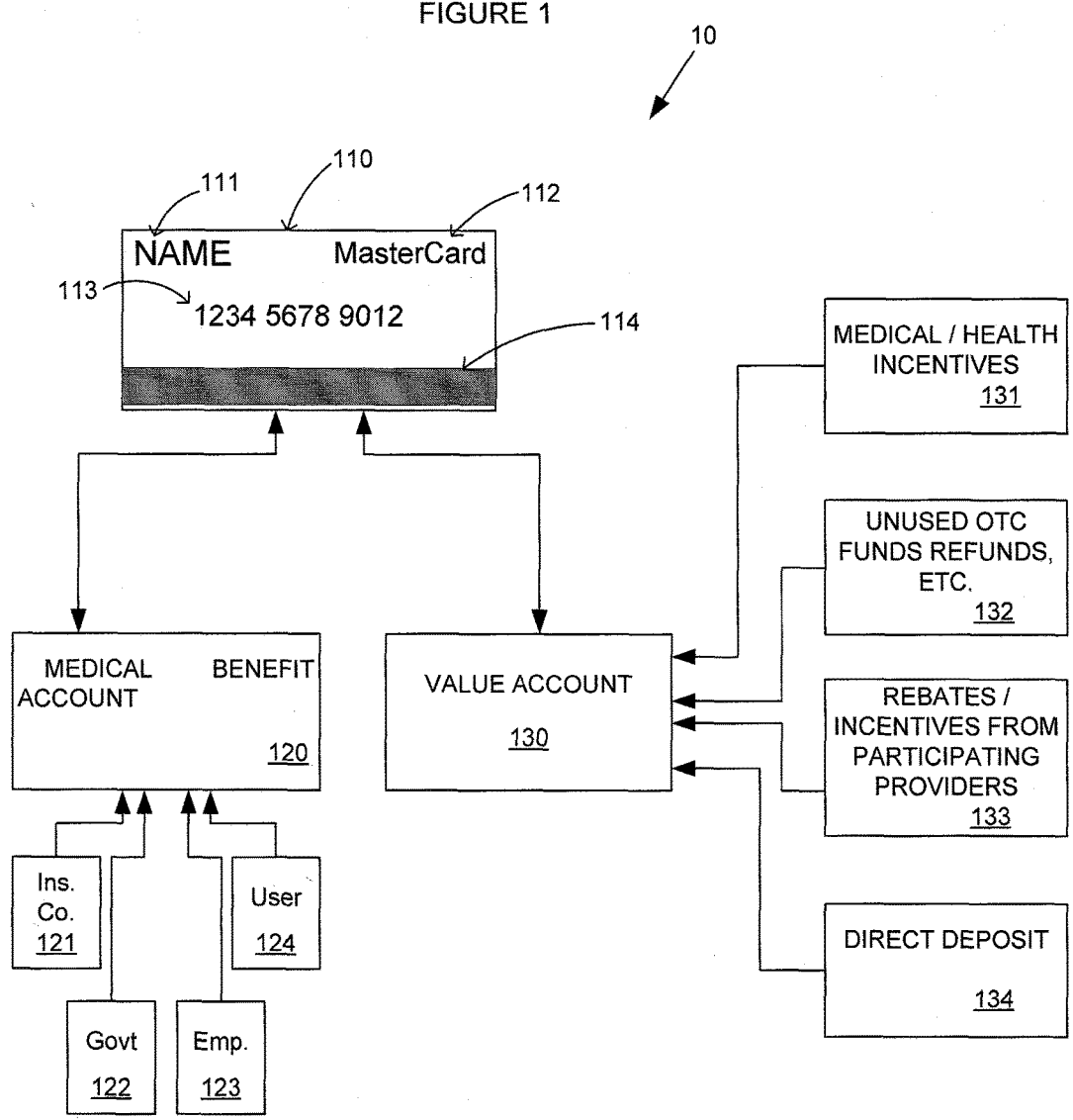
FIG. 1 illustrates an exemplary system of providing and processing transactions using a dual function medical benefits card, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

With reference to FIG. 1, a general system 10 that may be used for various transactions regarding a medical benefits card in accordance with some embodiments of the present invention will now be discussed. The system 10 may comprise a medical benefits card 110, which in turn my comprise a user name 111, identifier of networks the card 110 may be used on 112, an indicia or identifying information 113 in human-readable form, and/or a machine readable indicia 114 which may comprise the indicia 113, or may comprise a different indicia.

The medical benefit card 110 may be associated with one or more value accounts, comprising for example, a medical benefit account 120 and a value account 130. The medical benefit account 120 may be what is known as a "closed loop account," where the value in the account may only be redeemed in a private network or with a certain category of merchants, retailers, providers, etc., and may be limited to specific goods and/or services that may be purchased or obtained using the medical benefit account 120.

In contrast, the value account 130 may be what is known as an "open loop account," wherein the value may be used at a number of merchants or retailers. For example, value that may be redeemed on a major credit or debit card network (such as VISA, MasterCard, American Express, etc.) may be deemed "open loop," while a gift card that may be redeemed at a store (e.g., the Gap) or a group of stores (e.g., the Gap, Old Navy, Banana Republic) may be deemed "closed loop."

In accordance with some embodiments of the present invention, the medical benefit account 120 may receive funding or value from, for example, an insurance company or health care provider 121, a government entity 122, an employer 123 through a health savings account type of scenario, even tax-deferred contributions from a user 124.

The value account 130 may receive various incentives. For example, value account 130 may receive medical or health incentives 131, unused over-the-counter funds/refunds, etc. 132, rebates or incentives from participating providers 133, and/or direct deposit from the user itself 134. For example, a medical or health incentive 131 may comprise a deposit of, for example, $10.00 because a user attended a wellness check. Health savings account (and equivalent) funds that are unused may be deposited into the value account 130 at 132. A rebate or incentive from a participating provider 133 may comprise, for example, an amount being deposited from a health club, gym, grocery store, pharmacy, etc. that is triggered by desired behavior or in order to induce desired behavior. For example, if a user checks into a gym ten (10) times in a month, the user may receive a $10.00 incentive from the gym. If the user purchases healthy groceries (for example, a large ratio of fruits and vegetables) the user may receive an incentive from a grocery store. Alternatively, the user may receive the incentives from an associated insurance company, HMO, or health care provider based on the same activity (attending the gym, buying healthy foods, etc.).

Figure 2:
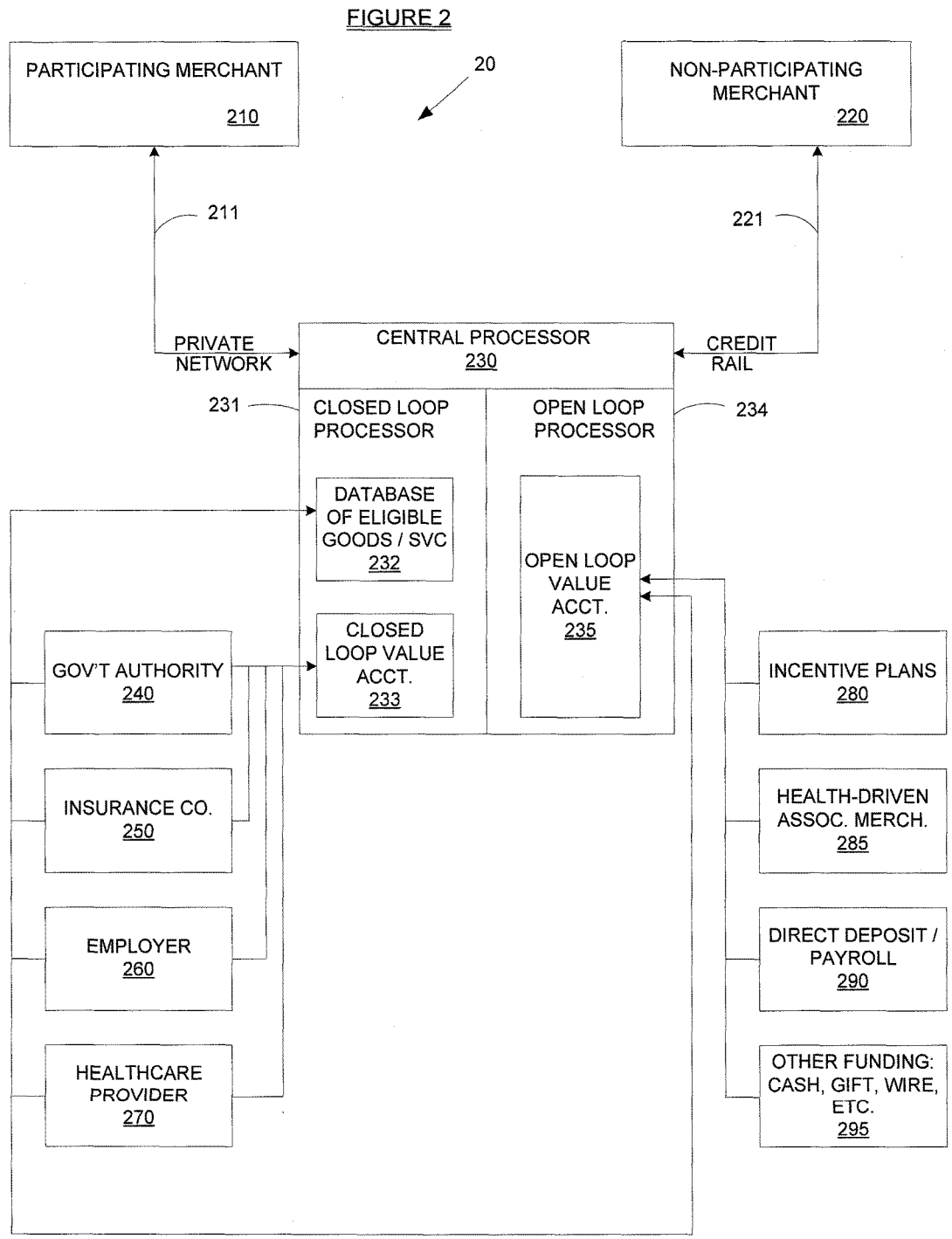
FIG. 2 illustrates an exemplary system of providing and processing transactions using a dual function medical benefits card, in accordance with some embodiments of the present invention.

With reference to FIG. 2, a system 20 in accordance with some embodiments of the present invention will now be discussed. System 20 may in general comprise a participating merchant 210, a non-participating merchant 220, and a central processor 230. Transactions with a participating merchant 210 may be conducted as closed loop transactions, and may be communicated with the central processor 230 via a private network 211. In contrast, transactions with the non-participating merchant 220 may be conducted as open loop transactions, and may be communicated with the central processor 230 via a credit or debit rail, such as the VisaNet, Visa, MasterCard, Discover, or American Express credit rail.

The central processor may comprise a closed loop processor or platform 231 and an open loop processor or platform 234. The closed loop processor 231 may comprise or be in communication with a database or data store 232 listing eligible goods and/or services that may be obtained by a customer using a medical benefits card, as well as a closed loop account 233 in which value applicable to the closed loop system may reside or be tracked.

The open loop processor or platform 234 may comprise or be in communication with an open loop account 235 in which value applicable to the open loop system may reside or be tracked.

Similar to that described with regard to FIG. 1 above, various entities may interact with the closed loop processor in order to both add value into the closed loop account 233 and to add, modify, delete, or alter entries (or to request the same) in the database or data store 232 listing eligible goods and/or services. For example, a government authority 240 (such as, for example, the MediCare or MedicAid system) may provide value into the closed loop account and/or may modify the listing of goods and/or services that can be purchased with closed loop MediCare or MedicAid funds. Similarly, insurance companies 250, healthcare providers 270, and even employers (who often select and manage health care programs for employees) 260 may provide value to the closed loop account 233 and/or edit the database or data store 232.

With regard to the open loop account 235, funding (such as incentives as noted above with regard to FIG. 1) may be provided into the open loop account 235 from a variety of sources, including, for example, the government authority 240, insurance company 250, employer 260, and/or healthcare provider 270. In addition, value may be provided into the open loop account 235 from additional sources, such as incentive plans 280, health-driven associated merchants or providers 285 (as discussed above: gym, grocery store, pharmacy), user instructed funding 290 such as direct deposit or payroll, and/or other funding sources 295, which may include but are not limited to cash deposits, gifts received, wire transfers, etc.

It can be seen that in accordance with some embodiments of the present invention, only parties that are associated with the medical benefits associated with the medical benefits card (and in some embodiments, the user) may provide value and other input into the closed loop account, while various incentives and value can be provided from other merchants or providers into the open loop account 235.

Figure 3:
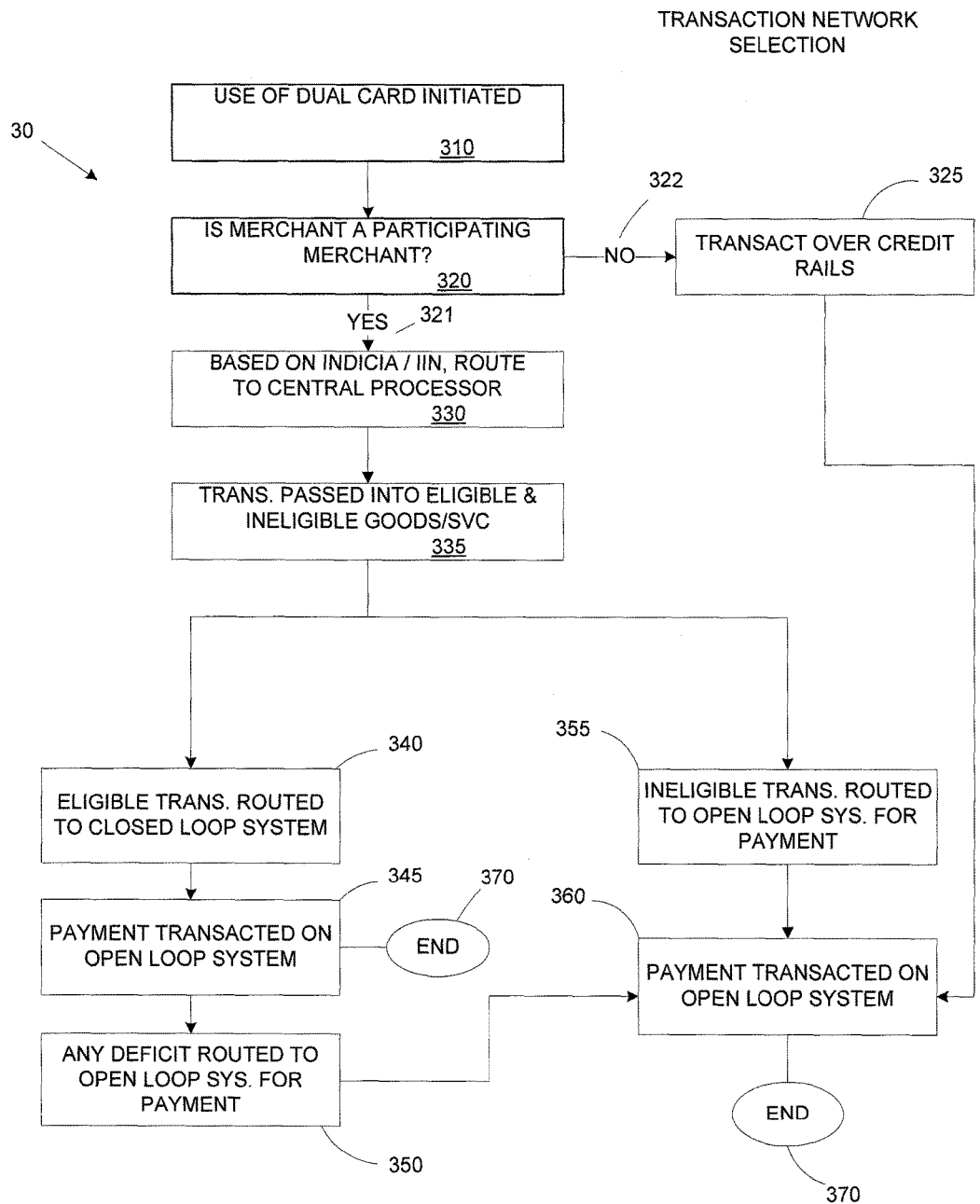
FIG. 3 illustrates an exemplary process of determining which transaction network over which to process transactions using a dual function medical benefits card, in accordance with some embodiments of the present invention.

With reference to FIG. 3, an exemplary method 30 in which the transaction network (e.g., open loop network (e.g., credit or debit rail) versus closed loop network) is selected will now be discussed. At 310 a transaction using a dual use card may be initiated. The term dual use card indicates the fact that the card can be used on both open loop and closed loop networks. While the dual use card discussed herein has accounts and/or purses that are specific to each network, it is also anticipated that a central or account may be utilized over both networks.

Once a transaction is initiated at 310, a determination may be made at 320 if the merchant at whom the transaction is being processed is a participating merchant. While this determination may be explicitly made, it is contemplated by the present invention that a non-participating merchant may process the dual use card as a typical credit instrument, and since the non-participating merchant's systems are not configured to recognize the dual use capability, may merely route the transaction over the credit or debit rails. If the merchant is not a participating merchant (as determined at 322), the transaction may be routed over the credit or debit rails at 325. The central processor may receive this transaction as a "typical" credit or debit transaction.

If the merchant is a participating merchant (at 321), the POS may route the transaction over a private network at 330. The POS of the participating merchant may recognize the transaction based upon an indicia on the card, an included issuer identification number (IIN), bank identification number (BIN), or other such information.

A distinction between transactions routed over the open loop system and transactions routed over the closed loop system may be the amount of information sent in each transaction. A transaction message routed over an open loop system may comprise information sufficient to identify the card (or underlying account), and the requested transaction amount. In contrast, a transaction message routed over a closed loop system may comprise additional information. For example, a closed loop transaction message may comprise the entire market basket of what the customer or user is purchasing or obtaining at the POS. As a non-limiting example, for a transaction message formatted in accordance with ISO 8583 this information may be included in Bit 111, which allows for 9999 characters of discretionary information. A transaction message that includes information identifying all items in the market basket may, for example, list the universal price codes (UPCs) of such items. Since the typical UPC is 12 characters long, over 800 items can be listed in a transaction. Should more information be needed, Bit 112 is also available for discretionary information.

At the central processor, the transaction data may be received from the participating merchant and may be parsed into eligible and ineligible goods and/or services at 335. Eligible goods and/or services may be routed to the closed loop processor at 340, while ineligible goods and/or services may be routed to the open loop processor at 355.

For the eligible goods and/or services, the payment may be transacted on the closed loop system at 345. For example, the amount of value in the closed loop account may be compared to the total amount due for the eligible goods and/or services, and if the amount of value in the account is greater than or equal to the total amount due, the transaction may be authorized (and the amount due deducted from the value in the account), and the transaction end at 370.

If the amount of value in the closed loop account is less than the total amount due the transaction may be denied. Alternatively, the customer may be asked for additional payment or to provide an additional payment source. In accordance with some embodiments of the present invention, the deficit amount may also be routed to the open loop processor at 350 for payment from the open loop account.

For ineligible goods and/or services, the transaction comprising such goods and/or services may be routed to the open loop system for payment at 355. Payment may be transacted on the open loop system at 360, in the manner known in the art (comparing the amount of the transaction to the amount of available value, deducting the amount of the transaction, etc.). The transaction may then end at 370.

Figure 4:
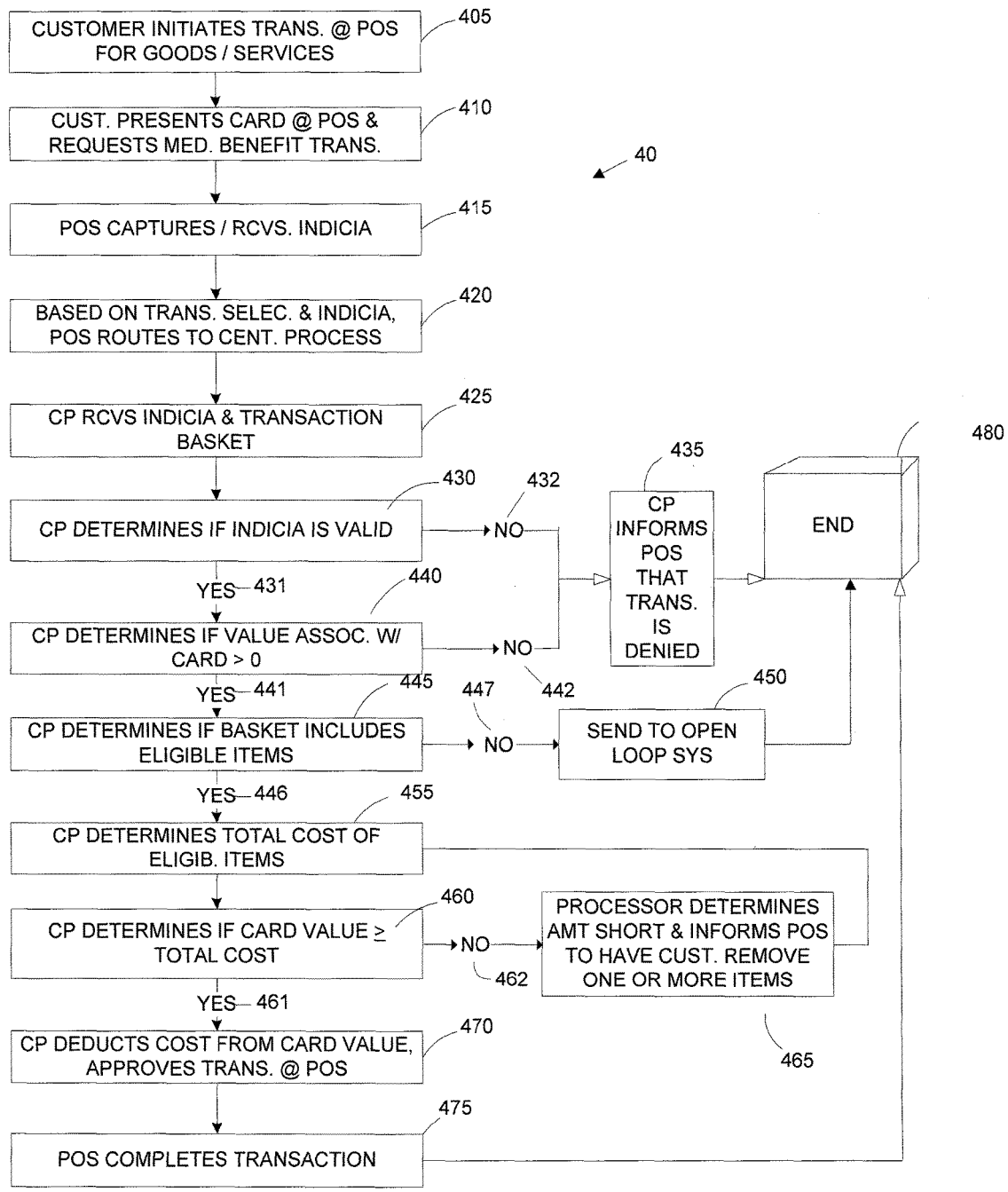
FIG. 4 illustrates an exemplary process for processing a closed loop transaction with a participating merchant using a dual function medical benefits card, in accordance with some embodiments of the present invention.

With reference to FIG. 4, a process 40 of conducting a closed loop transaction for goods and/or services with a participating merchant will now be discussed. A customer may initiated a transaction at a POS for goods and/or services at 405, and may present a card as at least partial payment for the transaction at 410 (the card may be a dual use card and/or a medical benefits card, as discussed above). At 415 the POS may read, capture, or otherwise receive an indicia from the card. For example, the indicia may be a magnetic stripe that may be read by a magnetic stripe reader; the indicia may be a bar code (standard, 2-D bar code, QR code, etc.) or other machine-readable indicia; the indicia may also be stored in, for example, a radio frequency identification (RFID) tag that may be interrogated by a POS.

In accordance with some embodiments of the present invention, the "card" may be a virtual card that may be associated with or executed, stored, or reside on a mobile computing device of a customer. A mobile computing device may be a mobile telephone, smart phone, tablet computer, laptop computer, netbook, personal data/digital assistant (PDA), etc. The mobile computing device may display a machine readable indicia (such as a bar code or QR code), or may list a human-readable indicia (such as a number or alphanumeric series) that the customer may read or otherwise provide to the POS.

At 420 the POS (or a host or gateway associated with the POS) may recognize the transaction and route the transaction to a central processor. Such transaction may be routed over a private or semi-private network. Alternatively, the transaction may be conducted over, for example, the Internet and may include various security and/or authorization information to request and/or process the transaction.

At 425 the central processor may receive the transaction information, which may comprise information sufficient to identify the card or underlying account(s)—such as the indicia from the card, as well as information identifying the goods and/or services selected by the customer and presented to the POS.

The central processor may determine if the card or account is valid, for example by determining if the indicia is valid, at 430. If the card or account is not valid at 432, the central processor may inform the POS that the transaction is denied at 435 and the transaction may end at 480. If the indicia is determined to be valid at 431, the process may continue. Note that it is contemplated that such determination may occur at any point in the process, and may also be omitted.

At 440 the central processor may determine if the card or account has a positive value. If the card or account has a value of zero or less at 442, the central processor may again inform the POS that the transaction is denied at 435 and the process may end at 480.

If the card or account is associated with a positive value at 441, then at 445 the central processor may determine at 445, based on the information included in the transaction message, if the basket includes any eligible goods and/or services. If there are no eligible goods and/or services at 447, then at 450 the central processor may either route the transaction to the open loop system or may inform the POS that the goods and/or services selected are not eligible for payment using the closed loop account.

If there are eligible goods and/or services, determined at 446, then the central processor may at 455 determine the total or aggregate cost of the eligible goods and/or services. At 460 the central processor may determine if the amount in the closed loop account is greater than or equal to the total cost of the eligible goods and/or services. If the amount in the closed loop account is less than the total amount due at 462, the central processor may determine the amount short and return that to the POS at 465 to inform the POS to request the customer either remove one or more items, or the customer may have to pay for such items with an alternative funding source (including, for example, the open loop account). If the customer removes one or more items, such removal may be transmitted to the central processor and the central processor may again determine the total cost of the eligible goods and/or services. Alternatively, the POS may send an updated market basket that omits the removed items.

If the amount in the closed loop account is greater than or equal to the total amount due at 461, the central processor may reduce the amount in the closed loop account by the total amount due, and send approval of the transaction to the POS at 470. The transaction may be completed at 475 and the transaction may end at 480.

Figure 5:
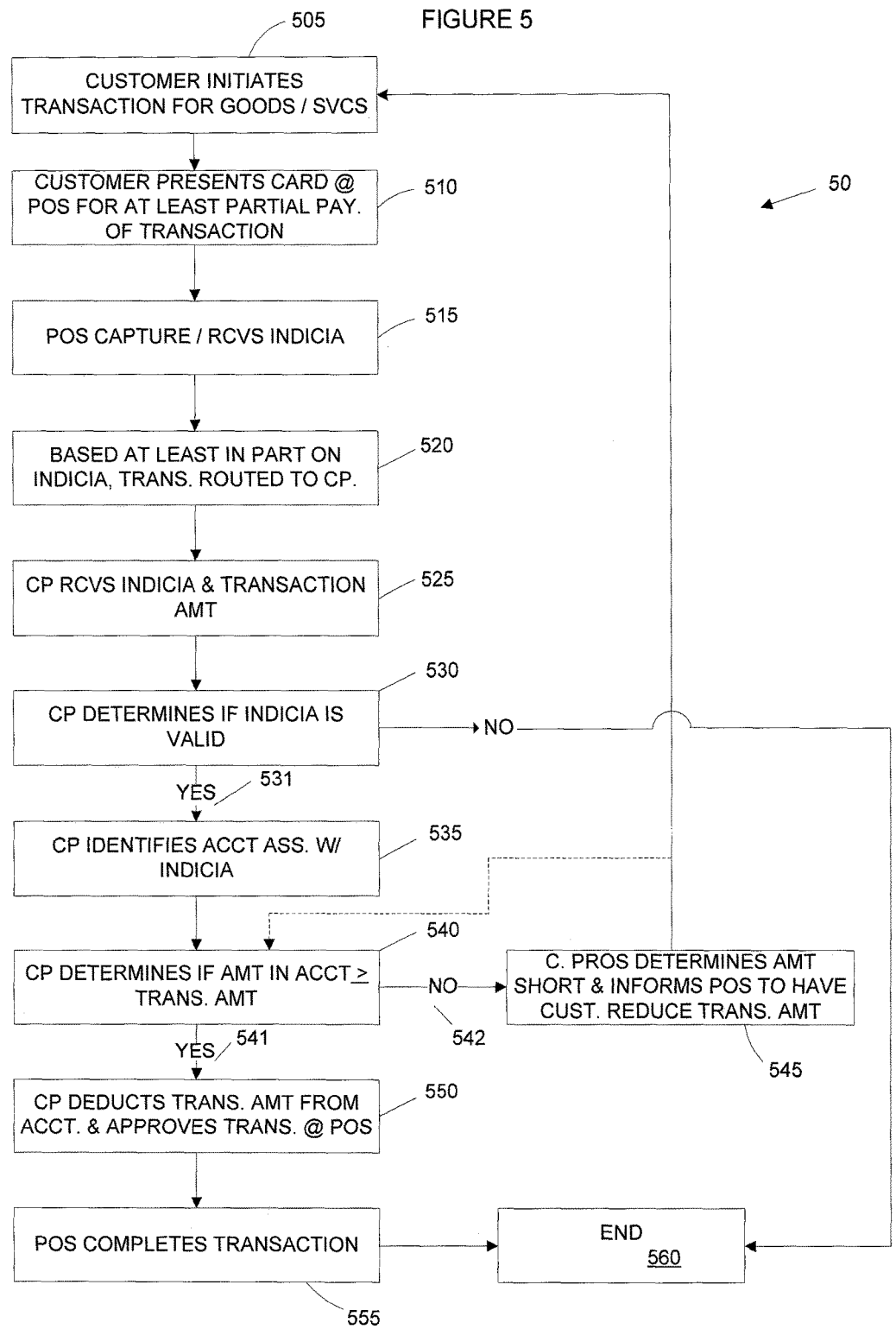
FIG. 5 illustrates an exemplary process for processing an open loop transaction with a non-participating merchant using a dual function medical benefits card, in accordance with some embodiments of the present invention.

With reference to FIG. 5, an exemplary process 50 of transacting an open loop transaction at a non-participating merchant in accordance with some embodiments of the present invention will now be discussed. At 505 a customer may initiate a transaction for goods and/or services at a point of sale (POS). The POS may be in a brick-and-mortar store, a digital store front (such as a website), an application or program running on a computing device, or even a telephone call to a person or IVR system that may take orders for purchases. The POS may even be a localized system, such as a fare-box or turnstile in a transit system.

At 510 the customer may present a medical benefits or other card at the POS in order to provide at least partial payment for the transaction. Note that as discussed above, the card may be a physical card (for example, in the shape of a standard credit or debit card), or may be a digital card that is stored on a customer's mobile computing device or mobile phone. Alternatively, the customer may merely recite or otherwise provide an indicia of the card to the POS.

At 515 the POS receives, reads, captures, or otherwise obtains the indicia from the card. This may occur through the use of a bar code scanner, magnetic stripe reader, RFID communications (or other near-field communications), and/or the customer otherwise providing the indicia to the POS.

At 520 the POS may route the transaction request to a central processor. The central processor may be identified, at least in part, by the indicia or a portion of the indicia. For example, the first four digits of an indicia may act as an issuer identification number (IIN) and route the transaction to the central processor, while the remaining digits of the indicia may identify the customer and/or the customer's account, health plans, employer, status, etc. Because the merchant may be a non-participating merchant, the communication between the POS and the central processor may be routed over an open loop credit or debit card network. For example, the communication may be sent over VisaNet or over the MasterCard network. Alternatively, the communication may be sent over an open loop credit or debit card network in part, and a private network in part. For example, a transaction may be conducted at a merchant using a private party payment system, such as Square, Inc. Since Square, Inc. may be listed as the merchant of record, the communications between the merchant and Square, Inc. may be conducted on a private network (for example, via a Square, Inc. application or program), while the communication between Square, Inc. and the central processor may be routed over a debit or credit card network. The POS may send to the central processor a transaction request, including (but not limited to) the indicia from the card (or a portion thereof) and a transaction amount representing the total amount due for the purchase of the goods and/or services at the POS.

At 530 the central processor may receive a transaction request from the POS. The transaction request may comprise the indicia (or a portion thereof), a transaction amount, identification of the network over which the transaction was received, and/or an identification of the originating merchant or merchant POS. The central processor may perform an initial determination to see if the indicia is valid at 530. If the indicia is not valid at 532, then the process may terminate at 560. If the indicia is valid at 531, then the process may continue. At 535 the central processor may identify an account associated with the indicia. Based on the indicia, the identity of the originating merchant or merchant POS, and/or the network over which the transaction was received, the processor may determine that the transaction is an open loop transaction and identify the open loop account associated with the card. When identifying the account, the central processor may also determine an amount of value in or otherwise associated with the open loop account.

At 540 the central processor may determine if the amount of value in or otherwise associated with the open loop account is greater than or equal to the transaction amount. If the amount of value in or otherwise associated with the open loop account is greater than or equal to the transaction amount at 541, then at 550 the central processor may deduct the transaction amount from the amount of value in or otherwise associated with the open loop account, and send an approval of the transaction request back to the merchant POS. The transaction may then be completed at 555 and the process may end at 560.

If at 542 the central processor determines that the amount of value in or otherwise associated with the open loop account is not greater than or equal to the transaction amount, at 545 the central processor may return a message to the POS that the transaction amount exceeds available funds. The central processor may provide the amount of deficit, or may merely respond with a denial of the transaction. The customer may then either provide an additional value source (at which point the transaction with the central processor will be conducted for an amount equal to the total amount available in or otherwise associated with the open loop account), or the customer may remove items from the purchase transaction. If the customer removes items from the purchase transaction, the process may, for example, start again at step 505 and be re-run, or may return to 540 and a new determination of the amount of the transaction compared with the amount of value in or otherwise associated with the open loop account may be processed.

Figure 6:
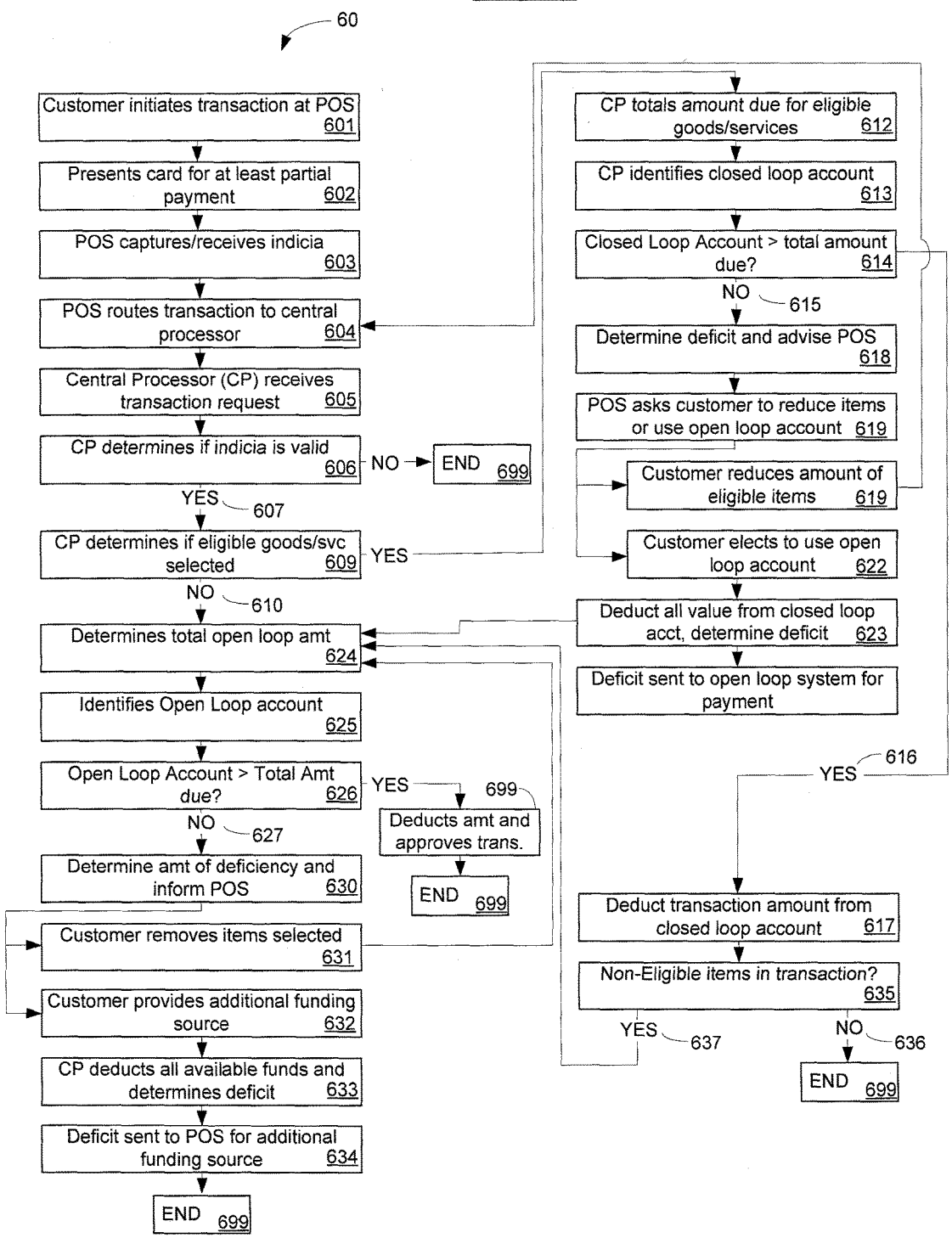
FIG. 6 illustrates an exemplary process for processing a transaction with a participating merchant using a dual function medical benefits card, in accordance with some embodiments of the present invention.

With reference to FIG. 6, an exemplary process 60 for both eligible and non-eligible goods and/or services at a participating merchant in accordance with some embodiments of the present invention will now be discussed. At 601 a customer may initiate a transaction related to the purchase or obtainment of goods and/or services at a POS of a participating merchant. At 602 the customer may provide the card for at least partial payment of the transaction. As noted above, the card can take many forms (physical or digital). At 603 the POS may capture, read, or otherwise receive an indicia from the card. As noted above, this may be accomplished in any number of ways known in the art, including but not limited to reading a bar code, magnetic stripe, RFID communications, etc.

At 604, based at least in part on the indicia, the POS may identify the central processor and route a transaction request to the central processor. The transaction request may include the indicia (or at least a portion thereof), identification of the merchant or merchant POS, a total transaction amount (which may represent an aggregate price due for the goods and/or services), and/or a market basket listing, which may list or identify each good or services sought to obtained by the customer in the transaction.

As noted above, the transaction message transaction message may be formatted in accordance with ISO 8583 this information may be included in Bit 111, which allows for 9999 characters of discretionary information. A transaction message that includes information identifying all items in the market basket may, for example, list the universal price codes (UPCs) of such items. Since the typical UPC is twelve (12) characters long, over 800 items can be listed in a transaction. Should more information be needed, Bit 112 is also available for discretionary information.

At 605 the central processor may receive the transaction request, including the indicia (or a portion thereof) and the market basket. At 606 the central processor may determine if the indicia is valid. If the indicia is not valid at 608 the process may end at 699. Note that a determination of whether the indicia is valid may also include a determination of whether the POS or merchant is authorized to transact or process transactions related to the card. Such determination may be made a POS level, terminal level, retail outlet level, merchant level, or merchant group level. Such determination may also be based upon a list of approved POS's, terminals, retail outlets, merchants, merchant groups, or even communication networks over which such transactions may be requested.

If the central processor determines that the POS is valid at 607, then the central processor may determine if the market basket lists any eligible goods and/or services. This determination may be based at least in part upon identifying information of the goods and/or services received in the transaction message. For example, the central processor may compare a list of UPCs or SKUs from the goods and/or services selected for purchase with a list or data store of eligible goods and/or services applicable to that card, customer, and/or merchant.

If there are eligible goods and/or services at 611, then the central processor may determine a total amount due for the eligible goods and or services at 612. Note that it is contemplated by the present invention that the medical benefits card may also provide a customer with certain promotions or other pricing for certain goods and/or services. In other words, if a customer has health plan A, the customer may receive a 10% discount on over-the-counter medications or other identified goods and/or services or classes, categories, or groups of goods and/or services. Similarly, if a customer has health plan B, the customer may receive a 10% discount at a certain merchant or merchant location. Such pricing incentive may be linked to the merchant, health plan, employer, governmental agency (for example participants in the Women, Infants and Children Program ("WIC") may receive a discount or even free goods or services related to the program), or even to a specific customer (for example, a customer who is considered morbidly obese by a health care program may receive discounts or benefits directed towards healthy food choices, while a healthy customer with the same or similar health care program may not receive the discount or benefit).

At 613 the central processor may identify the closed loop account associated with the indicia, and at 614 the central processor may determine if the amount in or otherwise associated with the closed loop account is greater than or equal to the total transaction amount for the eligible items. If the amount in or otherwise associated with the closed loop account is greater at 616 then the process may move to 617 where the central processor may deduct from the amount in or otherwise associated with the closed loop account the eligible item transaction amount. At 635 the central processor may determine if non-eligible items were also included in the transaction message. If at 636 it is determined there are not non-eligible items in the transaction message, then at 699 the process may end. If at 637 it is determined that there are non-eligible items in the transaction message, the then the process may move to step 624, discussed below.

If the central processor determines that there are not eligible items in the transaction request at 610, then at 624 the central processor may determine the total amount due for the non-eligible items. Similar to the determination of the total amount due for the eligible items, the medical benefits card may also provide a customer with certain promotions or other pricing for certain goods and/or services applicable even to non-eligible items. For example, although healthy food choices may not be paid for in whole or in part by a medical plan (and accordingly, may be considered a non-eligible item), a health care system, plan, sponsor, governmental authority, employer, associated merchant, etc., may either subsidize part of the cost of the healthy food choices or may provide a discount for such food choices.

At 625 the central processor may identify a closed loop value account associated with the card, and at 626 the central processor may determine the amount in or otherwise associated with the open loop account, and determine if the amount in or otherwise associated with the open loop account is greater than or equal to the total amount due for the non-eligible items. If the amount in or otherwise associated with the open loop account is greater than or equal to the amount due for the non-eligible items at 628, then the central processor may deduct the amount due from the amount in or otherwise associated with the open loop account, authorize the transaction back to the POS, and end the process at 699.

If at 627 the central processor determines that the amount in or otherwise associated with the open loop account is not greater than or equal to the total amount due for the non-eligible items, then the central processor may at 630 notify the POS of the deficit. The notification to the POS may include the exact amount of the deficit, or may comprise a simple denial of the transaction. The customer may then, at 631 remove items from the transaction, at which point the process may return to, for example, 624 at which point the total amount due for the non-eligible items may be recalculated.

Alternatively, the customer may at 632 provide an additional funding source (cash, an additional credit or debit instrument, etc.). At 633 the central processor may then deduct all available funds from the amount in or otherwise associated with the open loop account and send to the POS the deficit at 634 so that the POS seek alternative funding sources. The process may then end at 699.

Figure 7:
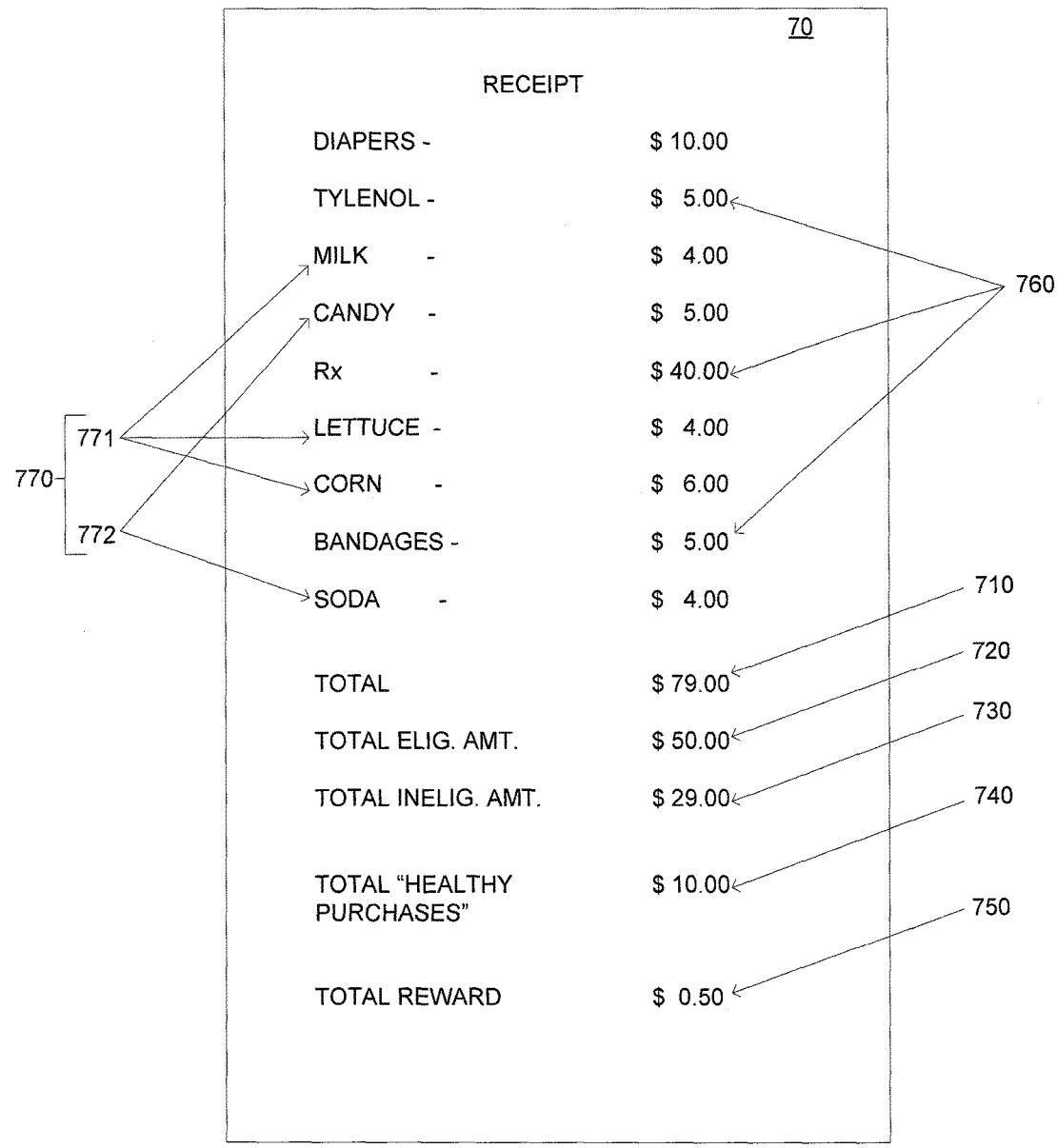
FIG. 7 illustrates an exemplary receipt or record of a transaction using a dual function medical benefits card, in accordance with some embodiments of the present invention.

With reference to FIG. 7, in accordance with some embodiments of the present invention, a customer may receive a receipt or record 70 that may detail the goods and/or services purchased, whether such goods and/or services were eligible or ineligible, the total amount for each, any rewards or incentives, etc. Note that it is contemplated that this receipt or record may be provided by the POS when the purchase transaction is complete, or may be emailed, mailed, or later communicated by the central processor, health care provider, etc. at a later time. Similarly, the receipt or record 70 may be periodically provided and tied to a reporting period (for example, once a quarter) rather than tied to a specific purchase transaction and may list out eligible and ineligible goods and/or services from the reporting period. The receipt or record 70 may be physically provided (such as a traditional paper receipt or report) or may be available online, digitally, audibly (for example, by calling an operator or an interactive voice recognition/response (IVR) system).

For example, a receipt 70 may include a total transaction amount 710 (listed on the exemplary receipt as $79.00), a total amount for eligible goods and/or services 720 (listed on the exemplary receipt as $50.00), and a total amount for ineligible goods and/or services 730 (listed on the exemplary receipt as $29.00). The receipt or record 70 may also indicate a category of goods and/or services that may be set, designated, or predetermined by a healthcare provider, employer, governmental agency, etc. which may be discounted or may provide rewards or incentives. For example, the receipt or record 70 may list "Healthy Purchases" 740 (listed on the exemplary receipt as $10.00), and a total reward 750 of $0.50. For example, the reward may be 5% of the healthy purchases.

The receipt or record may also list out each good and/or service purchased and its cost, much as a traditional receipt or sales record. The listing may be in the order the items were scanned. For example, eligible items 760 (listed on the exemplary receipt as "Tylenol," "Rx" (prescription), and "Bandages") may be listed, as well as ineligible items 770. Ineligible items 770 may be broken down into "Healthy Purchases" 771 (as noted above) and non-eligible, non-healthy purchases 772. Alternatively, the items may be grouped according to their status of eligible or ineligible.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method of conducting a transaction using a dual function card, the method transacted amongst a processor in selective communication with a merchant point of sale (POS), the method comprising:
   receiving by the processor from the merchant POS a transaction message, the transaction message comprising:
      an indicia of the dual function card; and
      identifiers of one or more goods and/or services selected for obtainment by a customer at the POS;
   determining by the processor, based on the indicia of the dual function card:
      whether a merchant associated with the merchant POS is a participating merchant or a non-participating merchant;
      at least one associated closed loop value account, an amount of value associated with the closed loop value account, and a schedule of eligible goods and/or services that can be obtained using the at least one associated closed loop value account;
      at least one associated open loop value account, and an amount of value associated with the open loop value account;
   upon a determination that the merchant is a participating merchant:
      determining by the processor, eligible goods and/or services, if any, from the one or more goods and/or services;
      determining a total amount purchase amount for the eligible goods and/or services and comparing the total purchase amount for the eligible goods and/or services to the amount of value associated with the closed loop value account, and upon a determination that the total purchase amount for the eligible goods and/or services is less than or equal to the amount of value associated with the closed loop value account authorizing the transaction and deducting the total amount purchase amount from the amount of value associated with the closed loop account;
      upon a determination that the total purchase amount for the eligible goods and/or services is less than the amount of value associated with the closed loop account, determining a deficit and determining if the amount of value associated with the open loop account is greater than or equal to the deficit, and if so, authorizing the transaction and deducting all value from the closed loop value account and the deficit from the open loop value account; and
   upon a determination that the merchant is a non-participating merchant, determining a total purchase amount of all goods and/or services selected by the customer and processing payment for all goods and/or services using the open loop account.

2. The method of claim 1, wherein the dual function card is a medical benefits card and eligible goods and/or services comprise qualifying medical expenses.

3. The method of claim 1, wherein the merchant POS is selected from the group consisting of: a merchant terminal located at a retail outlet; a computer processing a transaction conducted on the Internet or electronically; and a program, software, application, or app processing a transaction conducted electronically.

4. The method of claim 1, wherein the processor receives the transaction message over an open loop credit or debit card network.

5. The method of claim 1, wherein the processor receives the transaction message over a closed loop or private network.

6. The method of claim 1, wherein the processor receives the transaction message over the Internet.

7. The method of claim 1, wherein the identifiers of the goods and/or services comprise stock keeping units (SKUs) of each good and/or service.

8. The method of claim 1, wherein the identifiers of the goods and/or services comprise an identifier in a format in conformance with National Council for Prescription Drug Program (NCPDP).

9. The method of claim 1, wherein the processor is in selective communication with a data store, and wherein the processor determines eligible goods and/or services, if any, from the one or more goods and/or services by determining if any of the identifiers of the one or more goods and/or services matches an identifier stored in the data store as an eligible good and/or service.

10. A method of conducting a transaction using a dual function card, the method transacted amongst a central processor in selective communication with a merchant point of sale (POS), the method comprising:
   receiving at the POS identifiers of one or more goods and/or services for obtainment by a customer;
   receiving at the POS an indicia of a dual function card;
   determining by the POS, based upon the indicia of the dual function card, a processor associated with the dual function card;
   sending to the processor a transaction message comprising:
      the indicia of the dual function card; and
      the identifiers of the one or more goods and/or services;
   receiving by the processor the transaction message;
   determining by the processor, based on the indicia of the dual function card:
      at least one associated closed loop value account, an amount of value associated with the closed loop value account, and a schedule of eligible goods and/or services that can be obtained using the at least one associated closed loop value account;
      at least one associated open loop value account, and an amount of value associated with the open loop value account;

determining by the processor if a merchant associated with the merchant POS is a participating merchant or a non-participating merchant;

upon a determination that the merchant is a participating merchant:

determining by the processor, eligible goods and/or services, if any, from the one or more goods and/or services;

determining a total amount purchase amount for the eligible goods and/or services and comparing the total purchase amount for the eligible goods and/or services to the amount of value associated with the closed loop value account, and upon a determination that the total purchase amount for the eligible goods and/or services is less than or equal to the amount of value associated with the closed loop value account authorizing the transaction and deducting the total amount purchase amount from the amount of value associated with the closed loop account;

upon a determination that the total purchase amount for the eligible goods and/or services is less than the amount of value associated with the closed loop account, determining a deficit and determining if the amount of value associated with the open loop account is greater than or equal to the deficit, and if so, authorizing the transaction and deducting all value from the closed loop value account and the deficit from the open loop value account; and upon a determination that the merchant is a non-participating merchant, determining a total purchase amount of all goods and/or services selected by the customer and processing payment for all goods and/or services using the open loop account.

11. A method of conducting a transaction using a dual function card associated with an indicia, the method transacted amongst a central processor in selective communication with one or more merchants, the method comprising:

receiving at the central processor over an open loop network from a non-participating merchant a transaction request message, the transaction request message comprising:

the indicia of the dual function card; and an open loop transaction amount;

determining by the central processor based on the indicia an open loop value account and an amount of value therein;

determining by the central processor if the transaction amount is less than or equal to the amount of value in the open loop value account, and if so, authorizing the transaction and deducting the transaction amount from the amount of value in the open loop account;

receiving at the central processor over a closed loop or private network from a participating merchant a transaction request, the transaction request comprising:

the indicia of the dual function card; and identifiers of one or more goods and/or services selected for obtainment by a customer at the POS;

determining by the central processor, based on the indicia:

at least one associated closed loop value account, an amount of value associated with the closed loop value account, and a schedule of eligible goods and/or services that can be obtained using the at least one associated closed loop value account;

at least one associated open loop value account, and an amount of value associated with the open loop value account;

determining by the processor, eligible goods and/or services, if any, from the one or more goods and/or services;

determining a total amount purchase amount for the eligible goods and/or services and comparing the total purchase amount for the eligible goods and/or services to the amount of value associated with the closed loop value account, and upon a determination that the total purchase amount for the eligible goods and/or services is less than or equal to the amount of value associated with the closed loop value account authorizing the transaction and deducting the total amount purchase amount from the amount of value associated with the closed loop account;

upon a determination that the total purchase amount for the eligible goods and/or services is less than the amount of value associated with the closed loop account, determining a deficit and determining if the amount of value associated with the open loop account is greater than or equal to the deficit, and if so, authorizing the transaction and deducting all value from the closed loop value account and the deficit from the open loop value account.

\* \* \* \* \*